United States Patent
Georgitsis (10) Patent No.: US 7,472,031 B2
(45) Date of Patent: Dec. 30, 2008

(54) ADJUSTING A SCALE AND SORTER FOR A PARTICULAR PRODUCT BASED ON AN IDENTIFICATION SIGNAL FROM A TRANSPONDER CONTAINED THEREON

(75) Inventor: Nikolaos Georgitsis, Hamburg (DE)

(73) Assignee: Mettler-Toledo Garvens GmbH, Giessen (DE)

( * ) Notice: Subject to any disclaimer, the term of this patent is extended or adjusted under 35 U.S.C. 154(b) by 0 days.

(21) Appl. No.: 11/596,686

(22) PCT Filed: Apr. 21, 2005

(86) PCT No.: PCT/EP2005/004311

§ 371 (c)(1),
(2), (4) Date: Aug. 9, 2007

(87) PCT Pub. No.: WO2005/111554

PCT Pub. Date: Nov. 24, 2005

(65) Prior Publication Data

US 2008/0047760 A1 Feb. 28, 2008

(30) Foreign Application Priority Data

May 14, 2004 (DE) .................. 10 2004 024 109

(51) Int. Cl.
*G01G 19/40* (2006.01)
(52) U.S. Cl. ............... 702/101; 177/25.13; 209/592
(58) Field of Classification Search ............ 702/101, 702/102; 177/25.13; 209/592
See application file for complete search history.

(56) References Cited

U.S. PATENT DOCUMENTS

| | | | | |
|---|---|---|---|---|
| 5,644,489 A | * | 7/1997 | Hagenbuch | 455/456.1 |
| 5,694,656 A | * | 12/1997 | Huang | 5/290 |
| 5,923,001 A | * | 7/1999 | Morris et al. | 177/245 |
| 6,794,586 B1 | * | 9/2004 | Mason | 177/25.15 |
| 2002/0031997 A1 | | 3/2002 | Lawler, Jr. et al. | |
| 2002/0052703 A1 | * | 5/2002 | Tabet | 702/101 |
| 2003/0102367 A1 | | 6/2003 | Monette et al. | |
| 2005/0006153 A1 | * | 1/2005 | Baarsch et al. | 177/25.13 |
| 2005/0218219 A1 | * | 10/2005 | Sano et al. | 235/383 |

FOREIGN PATENT DOCUMENTS

| | | |
|---|---|---|
| EP | 1 174 909 A2 | 1/2002 |
| EP | 1 248 244 A2 | 10/2002 |
| JP | 2002171098 A2 | 6/2002 |
| JP | 2007-125449 A * | 5/2007 |
| RU | 2045780 C1 | 10/1995 |
| RU | 2127057 C1 | 3/1999 |
| WO | WO 00/21032 | 4/2000 |
| WO | WO 01/58603 A1 | 8/2001 |
| WO | WO 02/15115 A1 | 2/2002 |
| WO | WO 03/102501 A1 | 11/2003 |

* cited by examiner

*Primary Examiner*—Randy W Gibson
(74) *Attorney, Agent, or Firm*—Schwabe, Williamson & Wyatt (57) ABSTRACT

A product with a transponder is conveyed along a measurement line of a weighing device and an actual weight value is determined. An exchange of data with the transponder and weighing system enable automatic adjustment of the weighing system for a specified product type and/or sorting of the product based on comparisons of the actual weight value with a target weight value.

30 Claims, 2 Drawing Sheets

ADJUSTING A SCALE AND SORTER FOR A PARTICULAR PRODUCT BASED ON AN IDENTIFICATION SIGNAL FROM A TRANSPONDER CONTAINED THEREON

CROSS REFERENCE TO RELATED APPLICATIONS

The present application claims priority under 35 U.S.C. § 120 to International Patent Application No. PCT/EP2005/004311, filed Apr. 21, 2005, entitled "Method for Weighing a Product, Weighing System and Loading Device" and International Priority under 35 U.S.C. § 119 to co-pending German Patent Application No. 10 2004 024 109.0, filed May 14, 2004, entitled "Verfahren zum Wiegen eines Prodktes, Wägesystem und Bestückungsvorrichtung"; the entire contents and disclosures of which are hereby incorporated by reference in its entirety.

TECHNICAL FIELD

Embodiments of the invention relate to apparatus and methods for weighing a product. More particularly, various embodiments relate to techniques for determining an actual weight value for a product conveyed along a measurement line.

BACKGROUND

Various scales and weighing methods may be used to verify the weight of products for sale. Generally, if the product weight deviates from a specified target weight for a given product type by more than a specified tolerance value, the respective nonconforming product is separated out following the weighing process. Separation may be created by various rejection devices, such as a pusher, a blast nozzle, and/or a deflector. In this way, the scale provided with the rejection device checks weight to prevent products from being put into circulation which do not meet the given tolerances. For example, in the pharmaceutical field, the scale ensures, by weight calculation, the completeness of the pharmaceutical package. Preferably, each pharmaceutical package must have the same quantity of tablets, any package insert and/or the like. None of these package elements may be missing or the entire package may be separated for inspection.

Often the same scale may be used to weigh a variety of different product types. Unfortunately, for each respective product type of the product to be checked, a target weight and any associated tolerances should entered into the weighing system. The entry of the target weight and weight tolerances is usually made manually directly on the weighing instrument by the operating staff, which may result in manipulations or misadjustments and which is, in the practice, almost invariably without a direct, clear connection to the respective product being conveyed over the scale.

SUMMARY

In view of the problems in the state of the art, embodiments of the invention are based on the technical problem of optimizing a dynamic scale for effectively weighing a product, and methods for such weight measurements. A weighing system suitable to solve the problems which at least one embodiment of the invention is based on, with a weighing device for the determination of the actual weight value of a product deposited on it, includes an RFID communication device for the execution of a contactless exchange of data with a transponder connected to the product, with the RFID communication device being coupled with the weighing device for the transmission of the data.

In accordance with various embodiments of the invention, a product with a transponder is conveyed along a measurement line of a weighing device and an actual weight value is determined by the weighing system. An exchange of data with the transponder and weighing system may enable, among other things, automatic adjustment of the weighing device for a specified product type and/or sorting of the product based on comparisons of the actual weight value with a target weight value.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings, in which.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the described embodiments of the present invention, the phrase "A/B" means "A or B." For the purposes of the described embodiments of the present invention, the phrase "A and/or B" means "(A), (B), or (A and B)." For the purposes of the described embodiments of the present invention, the phrase "at least one of A, B, and C" means "(A), (B), (C), (A and B), (A and C), (B and C), or (A, B and C)." For the purposes of the described embodiments of the present invention, the phrase "(A)B" means "(B) or (AB)," that is, A is an optional element.

Reference in the specification to "one embodiment" or "an embodiment" means that a particular feature, structure, or characteristic described in connection with the embodiment is included in at least one embodiment of the invention. The appearances of the phrases "in one embodiment," "in an embodiment," "in embodiments," or "in various embodiments," in various places in the specification do not necessarily all refer to the same embodiment, but it may. Furthermore, the terms "comprising," "including," "having," and the like, as used with respect to embodiments of the present invention, are synonymous.

In accordance with various embodiments of the invention, a product with a transponder is conveyed along a measurement line of a weighing device and an actual weight value is determined by the weighing system. An exchange of data with the transponder and weighing system may enable, among other things, automatic adjustment of the weighing device for a specified product type and/or sorting of the product based on comparisons of the actual weight value with a target weight value.

In one embodiment, the weighing system includes a feeding device to feed the product to the weighing device prior to the weighing process and/or a discharge device for removing the product from the weighing device following the weighing process. This allows for an efficient operation of the weighing system since the weight determination of products fed in succession is possible with high throughput.

In one embodiment, the weighing device includes a weighing conveyor belt circulating in the longitudinal direction for the transport of the product, allowing the measurement of the actual weight of the product while it is in motion. In one embodiment, the feeding device and the discharge device each also include a conveyor circulating in the longitudinal direction. Thus the product to be weighed moves from the feeding conveyor to the weighing conveyor belt und onto the discharge conveyor belt without change in impulse. This allows the processing of a continuous product stream with maximum throughput in the weighing device.

In accordance with various embodiments of the invention, the transponder is a data storage medium used within the framework of radio frequency identification (RFID) technology allowing the contactless exchange of data. This means that data may be written without contact to the transponder using an RFID writing device and may then be read out again from the transponder using an RFID reader. The energy supply of the transponder as well as the data exchange with an RFID communication device is handled by using magnetic or electromagnetic fields. Thus there are no externally visible electronic components or contacts. A transponder consists of a large-surface coil and an antenna. For the operation of an RFID system, the communication device initially generates a high-frequency magnetic field in the antenna. This has the effect that the coil of the transponder is energized and the voltage is used by the transponder to provide a power supply, making a battery unnecessary. This is known as the principle of "inductive coupling". However, the data exchange within the framework of RFID technology may also be carried out on the basis of capacitative coupling. From the AC voltage generated in the coil of the transponder as described above, a clock frequency is derived which is then used as internal clock by the microprocessor.

The data transfer per se takes place by the magnetic field being switched on and off. Thus, in accordance with the method of at least one embodiment of the invention, it may be possible to read out data located on the transponder and/or to write new data to the transponder. In both application cases, the frequency of errors in the subsequent sorting process may be reduced. Thus, the weighing system carrying out the weighing process may read out information, such as e. g. product type, target weight and/or measuring tolerances, from the transponder of a product being conveyed. Based on this information, the general conditions of the subsequent measurement may be optimally set. Thus, specific required measuring tolerances may, for example, result in a specific measuring time or a specific number of individual measurements from which the final result is determined by averaging. The readout of the above-mentioned information from the transponder may make it possible to obtain actual weight values for the respective product with higher informative value and lower probability of errors. This also may make it possible to reduce the rate of incorrectly sorted products in the subsequent sorting operation. But the writing of information to the transponder of the product also enables an improved error control of the sorting process. In this way, the measured actual weight value may be stored in the transponder following the measuring process, and products that were sorted out via the rejection device may then checked again using an RFID reader. This may also make it possible, by comparing the actual weight value stored in the transponder with the target weight value, to locate products that might have been erroneously sorted out due to a malfunction of the sorting device and to re-feed them to the products intended for sale. Conversely, products destined for sale may be verified again in terms of their target weight, especially by the retailer receiving the products, and any products over or under the target weight may be sorted out retroactively. This may also make it possible to reduce the error rate in terms of weight sorting of the products to a considerable extent.

In accordance with at least one embodiment of the invention, it may be advantageous to read out, from the transponder, product information identifying the product type of the product prior to the determination of the actual weight value and to use this information for the determination of the actual weight. Then a weighing mode for the determination of the actual weight may be determined from the product information read out. This means that the measurement program, including measuring tolerances and conveying speed during measurement, number of measurements prior to weight determination and measurement frequency etc., may be automatically set by the weighing system based on the product information read out.

In this way, as mentioned above, the error frequency may be reduced in the subsequent sorting process, since a manual setting of these parameters is eliminated as a source of error. This embodiment also may make it possible to feed various product types to the measurement line in unordered sequence since a necessary change of the weighing mode is now set automatically via the product information read out from the transponder. This eliminates an upstream cost-intensive sorting operation.

In a suitable embodiment, a barcode which identifies the product type of the product and which is attached to the product is optically read out prior to the determination of the actual weight value. This information is preferably available in addition to the product information identifying the product type and read out from the transponder. This allows the verification of the respective correctness of the data respectively obtained from the various reader systems and the discovery of possible mislabeling or mispackaging of the respective product.

In addition, embodiments may be advantageously configured to analyze the actual weight value following its determination and to carry out the data exchange during the analysis. Accordingly, data may be written to the transponder during the analysis, may be read out from the transponder, or both processes may be carried out. Various embodiments are configured to write the actual weight value determined during the analysis to the transponder. This enables a rechecking of the correctness of the sorting of overweight or underweight products after the sorting has taken place. This may make it possible to reduce the reject portion of the products and it becomes possible for the recipient of the products, such as the retailer, to verify the actual weight value of the products received without great effort, i. e. simply by using an RFID reader.

It may also be expedient to use a target weight value determined by readout from the transponder for the analysis. This target weight value may either be read out directly from the transponder or it may be determined by readout of a different piece of information, such as e. g. the product information, and the subsequent association with a target weight value via an assignment table stored in the weighing system.

In the analysis, the actual weight value determined is then compared with the target weight value and, in the case of a more than admissible deviation of the values, a control signal will be sent to the sorting device which then rejects the respective product. It is also possible for the analysis to be performed later at the sorting device if both the actual weight value and the target weight value are stored in the transponder. In this case, a data connection between the weighing system and the sorting device is unnecessary and the sorting process may be completely decoupled from the weighing process. Thus the sorting device merely requires an RFID reader and an analyzer, which decides on the need for rejecting the product based on the data stored in the transponder.

In an expedient embodiment, a device upstream of the measurement line transmits data to the measurement line, whereupon the transmitted data is written to the transponder. In this way, all data relevant for the product may be written to the transponder via the RFID writing device of the weighing system. This eliminates the need for the expensive equipping of upstream devices with RFID writing devices.

In one embodiment, the product is loaded with a number of individual products prior to the determination of the actual weight, and information identifying the loading is written to the transponder. This piece of information may be written to the transponder prior to the determination of the actual weight or after the determination of the actual weight. Preferably, the loading is carried out by a selected loading unit of a loading device and identifying information associated with the selected loading unit is written to the transponder. This identifying information may either be written directly by the loading device to the transponder or it may be first transmitted to the weighing system from the loading device and then written to the transponder by the RFID communication device of the weighing system. The loading device may, for example, be a filling station with various fill heads for the filling of product packaging bags. Following the loading of the product with individual products by a selected loading unit, an identification number identifying the loading unit is written to the transponder.

If, during the subsequent weighing of the product, an actual weight value deviating from the target weight value is determined, the weighing system then sends a control signal to the respective loading device. The control signal effects a suitable correction of the number of individual products fed to a product by the loading device during the loading process with the respective identification number. In this process, the weighing system may either read out the identification number identifying the associated loading unit from the transponder or the identification information is sent to the weighing system by the loading device in the order of the incoming products. In the event that the weighing system reads out the identifying information of the loading unit from the transponder, it is no longer necessary to maintain the order of the products between the loading device and the weighing system. This enables maximum flexibility in the manufacturing process.

In one embodiment, the RFID communication device includes an RFID reader for the readout of product information identifying the product type of the product from the transponder. In this way, a weighing mode to be used for the weighing process may be determined. In this way, the weighing device automatically sets the measuring parameters, such as measuring tolerances, conveyor belt speed during the measurement, and number of measurements prior to averaging or measuring frequency. A manual entry of these parameters is thus unnecessary.

In one embodiment, the RFID reader is arranged on the feeding device or the discharge device and the product information transmitted by the RFID reader may be saved in the weighing device. The saved information may then be used for statistical purposes. Thus, for example, product-specific weight distributions may be determined, allowing the derivation of improvement measures for the filling process and also the weight determination process.

One embodiment of the weighing system includes a barcode reader, arranged on the feeding device, for the optical readout of product information which identifies the product type of the product and which is optically attached to the product. As presented above in relation to the method in accordance with at least one embodiment of the invention, this information offers the possibility of additional verification of the information read out from the transponder as well as the possibility of verifying whether the product is provided with the correct packaging. The barcode reader may be replaced by an optical camera which is capable of identifying barcode identification. The camera further allows the determination of whether transparent packages are correctly filled or whether, for example, a tab protrudes from the package. Furthermore, the weighing system may also be equipped with a volume measuring device for the determination of the product volume. Using various reading or measuring systems, it becomes possible to detect mislabeling or mispackaging particularly well. Furthermore, the weighing system may also include a metal detector for sorting out metal-containing products.

This enables compliance with the applicable guidelines for food products which require that no metal contaminations are passed into the stream of commerce. The presence of metal content may then also be documented on the transponder. Furthermore, the weighing system preferably includes an X-ray device or X-ray apparatus in order to detect contaminations in the product. These measurement results are preferably documented on the transponder, which makes it possible to shift the analysis of the results and a possible decision on the sorting to a later time.

In one embodiment, the RFID communication device includes an RFID writing device arranged on the discharge device for writing the determined actual weight value of the product to the transponder of the respective product. In this way, in the case of a reject immediately after the measurement, the correctness of the rejection may be checked again. The sorting process may also take place independently of the measurement sequence at a later date.

In one embodiment, the weighing system includes an interface for receiving data sent from an upstream device, and the RFID communication device includes an RFID writing device for writing the received data to the transponder. For example, an upstream loading device may transmit information identifying the loading to the weighing system, whereupon this information is written, together with the actual weight of the product determined by the weighing system, to the transponder by the RFID communication device of the weighing system.

In one embodiment, the weighing system includes a labeling device for attaching a transponder to the product. Expeditiously, this labeling takes place after the weighing process. In this way, the measured actual weight value may be saved in the transponder prior to or after the labeling. This enables an economic handling of transponders because, for example, only products with actual weight values deviating from the target weight may be labeled in order to provide for the option of post-control.

A loading device, suitable to solve the problem which at least one embodiment of the invention is based on, for the loading of a product with a number of individual products is characterized by an RFID communication device to carry out a contactless transfer of data with a transponder connected to the product. By using such a loading device, it becomes possible to store product-specific data that is useful for a subsequent weighing process, such as e. g. product information identifying a product type of the product, making it possible to use optimal measurement settings in the weighing process and resulting in a measurement result exhibiting, accordingly, a high degree of accuracy and correctness. This allows the prevention of erroneous rejects to a large extent within a sorting process that is subsequently performed.

Figure 1:
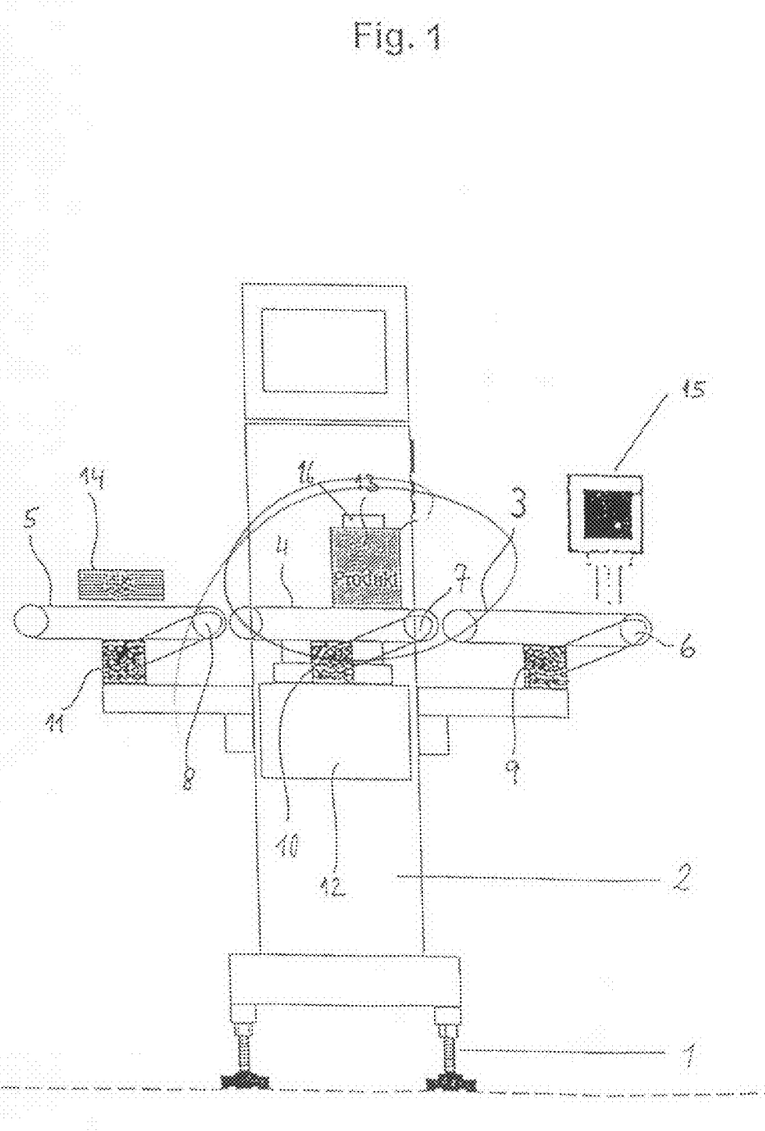
FIG. 1 shows a first embodiment of a weighing system according to the invention with an RFID reader arranged on a feeding conveyor belt.

Referring now to FIG. 1, an embodiment of a weighing system includes a basic frame 2 with height-adjustable legs 1, standing on the floor, on which a feeding conveyor belt 3, a weighing conveyor belt 4 serving as measurement line and a discharge conveyor belt 5 are arranged in succession in horizontal alignment. The three conveyor belts 3, 4 and 5 are guided in the same direction and circulate at the same speed over two horizontally distanced rollers each of which, respectively, the rollers 6, 7 and 8 are driven by electric motors 9, 10 resp. 11. These electric motors are controlled such that the setting of the same conveyor belt speed is guaranteed for all three conveyor belts 3, 4 and 5.

The weighing conveyor belt 4, serving as measurement line, is supported on a weighing cell 12 fixed on the basic frame 2. The weighing conveyor belt 4 serving as measurement line is charged individually with the products 13 to be weighed at the entry side, relative to the transport direction, of the feeding conveyor belt 3. The weighing conveyor belt 4 serving as measurement line transports the charged product 13 to its exit side, relative to the transport direction, where it transfers it to the discharge conveyor belt 5, to which is attached a sorting device 14, only schematically suggested, for example in the form of a pusher or a blast nozzle, from which products 13 with incorrect weights may be rejected. At the feeding conveyor belt 3, there is an RFID reader 15 for the contactless readout of data stored in a transponder. In the present embodiment of the weighing system, the products 13 arrive at the weighing system with an RFID label including a transponder 16. The RFID reader 15 captures product data already stored on the transponder 16. The reader then forwards this data to a computer in the terminal of the weighing system. Using the product data, the computer may associate the product 13 with a product type or product in a stored product database. The weighing system then automatically adjusts to this product data. On the weighing conveyor belt 4, the weighing system determines the weight of the product 13. The product may still be sorted out after the weighing conveyor belt 4. To do so, e. g. a pusher, blast nozzle or deflector transports underweight or overweight products into a collection container.

Figure 2:
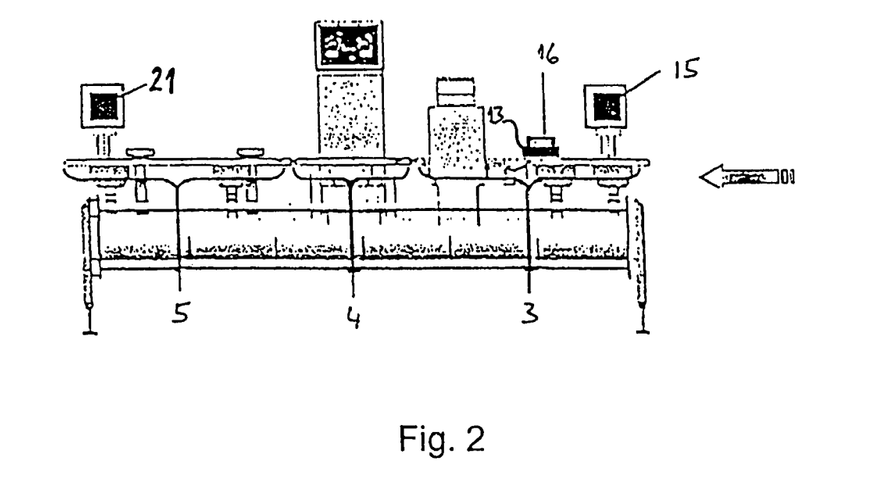
FIG. 2 shows another embodiment of a weighing system according to the invention with an RFID reader arranged on a feeding conveyor belt and another RFID communication device arranged on a discharge conveyor belt.

Referring now to FIG. 2, another embodiment of the weighing system according to the invention is shown. This embodiment also includes a feeding conveyor belt 3, a weighing conveyor belt 4 and a discharge conveyor belt 5. A product to be weighed is moved in the direction of the arrow over the weighing system. As in the embodiment shown in FIG. 1, there is an RFID reader 15 arranged on the feeder conveyor belt 3. In this arrangement as well, the RFID reader 15 captures the product data already stored in the transponder 16 of a fed product 13. The computer associates the product with a product type or product in the stored product database and the weighing system automatically adjusts to this product data. Following the determination of the weight of product 13 on the weighing conveyor belt, an RFID communication device 21, implemented as a writing device and arranged on the discharge conveyor belt 5, writes the weight data and, as the case may be, lot information to the transponder 16 of product 13.

Now there are several data records in the transponder 16, i. e. the product data and the specific information added by the weighing system, including the measured actual weight of product 13. As in the previous embodiment, the product may be sorted out following the weighing conveyor belt 4. This may take place before or after the RFID writing process. Furthermore, the weighing system may also include a metal detector, which is preferably arranged at or on the feeding conveyor belt 3. The metal detector checks whether there are metal components in the packaged product 13. Then, especially on the discharge conveyor belt 5 following the weighing, a pusher or blast nozzle may reject a product 13, identified as containing metal, into a collection container. This option is especially important for food products, for the applicable guidelines require that no metal contaminations may pass into the stream of commerce. But the weighing system may also be designed such that the test of metal content is performed, but the respective product is not rejected for the time being. In this case, the RFID communication device 21, implemented as a writing device, may also save this information.

Furthermore, in the embodiment shown in FIG. 2, a barcode scanner and/or a volume measuring device may be arranged on the feeding conveyor belt in addition to the metal detector. If a barcode is present on the product 13, the barcode scanner reads the respective data. The volume measurement device then measures the volume of the product, whereupon the metal detector checks the product 13 for metal content. All respective data is forwarded to the computer of the weighing system, whereupon the computer compares the data of the RFID reader, the barcode scanner, the volume measuring device and the metal detector in order to detect a mislabeling. A product which bears e.g. the wrong barcode but has the right RFID label may be rejected here. If the system does not reject metal-containing products, incorrect or incorrectly programmed transponders, incorrect barcodes or incorrect volumes, the RFID communication device 21 may also store the respective data.

Furthermore, in the embodiment of a weighing system shown in FIG. 2, there may also be a camera or an X-ray device arranged on the feeding conveyor belt 3, in addition to a metal detector, a barcode scanner and a volume measuring device. A camera then checks the products 13 after the barcode scanner. It may detect, among other things, whether transparent packages are correctly filled or whether tabs protrude from the package.

The camera may also completely replace the function of the barcode scanner, for it may also capture EAN-compliant barcode data. Instead of or in addition to the camera, an X-ray device may also check the products using X-rays. It checks the mass of the product to look for contaminations. If a product does not match the preset mass, the X-ray device reports the result to the weighing terminal. Subsequently, the computer of the weighing system may compare the data of the RFID reader, the barcode scanner, the camera, the volume measuring device and the metal detector in order to detect mislabelings. These products may then be rejected or, in the event that this does not happen, respective information may be written to the transponder 16 of product 13.

In another embodiment of the weighing system in accordance with the invention, the RFID communication device 21, shown in FIG. 2, is implemented as an RFID reader/writing device. There is no RFID communication device on the feeding conveyor belt. The products arrive at the weighing system already equipped with an RFID label. Then the product data or product type data has to be manually set on the terminal of the weighing system because RFID label cannot be automatically read in due to the lack of an RFID reader on the feeding conveyor belt 3. Following the weighing process, the RFID writing device/reader 21 reads the product data from the transponder. In this way, the system may collect statistical data on the product data and the throughput. The function may also be carried out when the RFID communication device 21 is implemented merely as an RFID reader. At the same time, the RFID communication device 21 implemented as a RFID reader/writing device writes the actual weight values and, as the case may be, other lot information to the transponder 16. If the RFID label does not yet contain data, while moving through the weighing device, the combined writing device/reader 21 also writes the preset product data of the computer of the weighing system to the transponder 16. As in the previous embodiment of the weighing system, this embodiment of the weighing system may also include a metal detector and/or a volume measuring device on the feeding conveyor belt 3. Furthermore, there may also be a barcode scanner provided on the feeding conveyor belt, which the weighing system may use to perform an automatic product switch if there is a barcode on the product. The scanner forwards the number of the barcode to the computer in the terminal of the weigher. Based on this number, the computer may then associate the product 13 with a product type or product in the stored product database.

In the event of a lack of a barcode on product 13, the user has to set the product data manually on the weigher. As in the previous embodiment, there then [can] be an X-ray device additionally provided on the feeding conveyor belt 3. Furthermore, the RFID communication device 21 may be implemented as an RFID labeler with write/read function. In this case, the product 13, which is conveyed to the weighing system, does not have to be provided with an RFID label yet. When the product 13 reaches the discharge conveyor belt, the RFID labeler then prints an RFID label bearing a transponder 16 on the product. Simultaneously, the device writes the preset product data of the weighing system, the actual weight data and, as the case may be, other lot information into the transponder 16 of the label.

Figure 3:
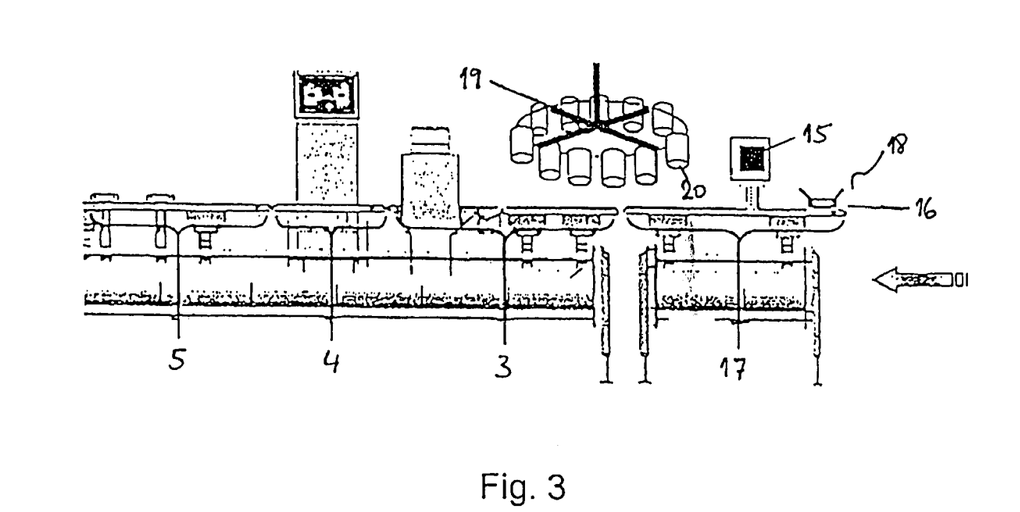
FIG. 3 shows an arrangement of a weighing system in accordance with an embodiment of the invention with a loading device exhibiting an RFID writing device.

Referring now to FIG. 3, another embodiment of the weighing system in accordance with the invention is shown. In addition to the feeding conveyor belt 3, weighing conveyor belt 4 and discharge conveyor belt 5 which are also provided in the previous embodiments, this embodiment furthermore includes a separate conveyor belt 17 of a filling section. An RFID writing device 15 is arranged on this conveyor belt 17. Behind the RFID writing device 15, there is a filling station 19 which fills the product content into the product packages 18 which are conveyed and which bear an RFID label. The filling station 19 includes a number of fill heads 20, which are associated with continuous fill head numbers for identification. The RFID writing device 15 writes the fill head number used for the filling of the product package 18 to the transponder. The device is synchronized with the filling station. The RFID writing device 15 passes this data record on to the weighing terminal as well. The actual weight of the product 13 is determined on the weighing conveyor belt 4. If the product 13 is too heavy or too light, the terminal reports the data to a filling station 19 via the fill head test option. The filling station 19 then adjusts the fill quantity of the respective fill head 20 (fill head-specific trend adjustment). Overweight or underweight products may still be rejected on the discharge conveyor belt 5 via a sorting device. In another embodiment, the RFID writing device 15 at the filling station may also be omitted. Since the fill head-specific data is also forwarded to the weighing terminal, this data may be written to the transponder later using an RFID writing device arranged on the weighing system.

Still further, although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. A method for weighing a product, comprising:
conveying a product having a transponder along a measurement line of a weighing system;
receiving data from the transponder; and
automatically adjusting the weighing system, prior to determining weight of the product, using the received data from the transponder; and
determining an actual weight value of the product using the weighing system.

2. The method in accordance with claim 1, further comprises optically reading a barcode, attached to the product and configured to identify a product type of the product, prior to the determining of the actual weight value.

3. The method in accordance with claim 1, further comprises analyzing the actual weight value after the determining and exchanging data with the transponder during the analyzing.

4. The method in accordance with claim 3, wherein the exchanging during the analyzing includes writing the determined actual weight value to the transponder.

5. The method in accordance with claim 3, wherein a target weight value is determined by readout from the transponder and compared to the determined actual weight value during the analyzing.

6. The method in accordance with claim 1, further comprises receiving data at the measurement line transmitted from a device upstream from the measurement line and writing the received data to the transponder.

7. The method in accordance with claim 1, further comprises loading the product with a number of individual products prior to the determining of the actual weight value and writing information identifying the loading to the transponder.

8. The method in accordance with claim 7, wherein the loading is carried out by a selected loading unit of a loading device and the writing information to the transponder includes identifying information associated with the selected loading unit.

9. A method for weighing, comprising:
conveying a product having a transponder configured to exchange data along a measuring line of a weighing system configured to determine an actual weight value for the product;
upon determining the actual weight value, writing the determined actual weight value to the transponder;
comparing the determined actual weight value with a target weight value; and
generating a sort control signal based on the comparison.

10. The method in accordance with claim 9, further comprises optically reading a barcode, attached to the product and configured to identify a product type of the product, prior to the determining of the actual weight value.

11. The method in accordance with claim 9, wherein the comparing further comprises analyzing the actual weight value relative to a specified tolerance value and exchanging data with the transponder.

12. The method in accordance with claim 11, wherein the exchanging includes writing a sort control signal to the transponder based in part on the comparison of the determined actual weight value.

13. The method in accordance with claim 11, wherein the target weight value is determined by readout from the transponder.

14. The method in accordance with claim 9, further comprises receiving data at the measurement line transmitted from a device upstream from the measurement line and writing the received data to the transponder.

15. The method in accordance with claim 9, further comprises loading the product with a number of individual products prior to the determining of the actual weight value of the product and writing information to the transponder identifying the loading.

16. The method in accordance with claim 15, wherein the loading is carried out by a selected loading unit of a loading device and the writing to the transponder includes identifying information associated with the selected loading unit.

17. A weighing system comprising:
an RFID communication device configured to exchange data contactless with a transponder connected to a deposited product; and
a weighing device, coupled with the RFID communication device, for determination of an actual weight value of the product, the weighing device having a weighing conveyor belt and an adjustment device, the weighing conveyor belt serving as a measurement line on which the products are conveyed, the adjustment device is configured to automatically adjust the weighing system based on information read from the transponder during the contactless exchange of data.

18. The weighing system in accordance with claim 17, further comprises a feeding device for conveying the product to the weighing device and/or a discharge device for removing the product from the weighing device.

19. The weighing system in accordance with claim 17, wherein the RFID communication device includes an RFID reader configured to read product information identifying a product type of the product from the transponder.

20. The weighing system in accordance with claim 19, wherein the RFID reader is selectively positioned at a feeding device and/or a discharge device and the product information transmitted by the RFID reader is stored in the weighing device.

21. The weighing system in accordance with claim 17, wherein the weighing system includes an interface for receiving data transmitted by an upstream device and the RFID communication device includes an RFID writing device to write the received data to the transponder.

22. The weighing system in accordance with claim 17, further comprises a labeling device configured to attach at least one transponder to each product to be weighed.

23. A weighing system comprising:
an RFID communication device for carrying out a contactless exchange of data with a transponder connected to a deposited product; and
a weighing device, coupled with the RFID communication device, for the determination of an actual weight value of the deposited product, the weighing device includes a weighing conveyor belt to serve as a measurement line, on which the products are conveyed, a transmitter device to write the actual weight value determined to the transponder, a comparator device to compare the written actual weight value with a target weight value, and a controller device for generating a sort control signal depending on the weight value comparison.

24. The weighing system in accordance with claim 23, further comprises a barcode reader coupled to a feeding device for conveying the product to the weighing device and positioned to optically attach to the product, the barcode reader configured to optically read product information to identify a product type of the product.

25. The weighing system in accordance with claim 23, wherein the RFID communication device includes an RFID writing device, arranged at a discharge device for removing the product from the weighing device, configured to write the determined actual weight value of the product to the transponder of the respective product.

26. The weighing system in accordance with claim 23, further comprises a feeding device for conveying the product to the weighing device and/or a discharge device for removing the product from the weighing device.

27. The weighing system in accordance with claim 23, wherein the RFID communication device includes an RFID reader configured to read product information identifying a product type of the product from the transponder.

28. The weighing system in accordance with claim 27, wherein the RFID reader is selectively positioned at a feeding device and/or a discharge device and the product information transmitted by the RFID reader is stored in the weighing device.

29. The weighing system in accordance with claim 23, wherein the weighing system includes an interface for receiving data transmitted by an upstream device and the RFID communication device includes an RFID writing device to write the received data to the transponder.

30. The weighing system in accordance with claim 23, further comprises a labeling device configured to attach at least one transponder to each product to be weighed.

* * * * *

UNITED STATES PATENT AND TRADEMARK OFFICE
CERTIFICATE OF CORRECTION

Page 1 of 3

PATENT NO. : 7,472,031 B2
APPLICATION NO. : 11/596686
DATED : December 30, 2008
INVENTOR(S) : Nikolaos Georgitsis It is certified that error appears in the above-identified patent and that said Letters Patent is hereby corrected as shown below:

Title page, illustrative fig. 1 should be deleted and substitute therefore the attached title page consisting of illustrative fig. 1.

In the Drawings

The drawing sheet 1 of 2 consisting of Fig(s) 1 should be deleted and substitute therefore the attached drawing sheet 1 of 2 consisting of Fig(s) 1.

Signed and Sealed this
Twenty-sixth Day of July, 2011

David J. Kappos
*Director of the United States Patent and Trademark Office*

(12) United States Patent
Georgitsis (10) Patent No.: US 7,472,031 B2
(45) Date of Patent: Dec. 30, 2008

(54) ADJUSTING A SCALE AND SORTER FOR A PARTICULAR PRODUCT BASED ON AN IDENTIFICATION SIGNAL FROM A TRANSPONDER CONTAINED THEREON

(75) Inventor: Nikolaos Georgitsis, Hamburg (DE)

(73) Assignee: Mettler-Toledo Garvens GmbH, Giessen (DE)

(*) Notice: Subject to any disclaimer, the term of this patent is extended or adjusted under 35 U.S.C. 154(b) by 0 days.

(21) Appl. No.: 11/596,686

(22) PCT Filed: Apr. 21, 2005

(86) PCT No.: PCT/EP2005/004311

§ 371 (c)(1), (2), (4) Date: Aug. 9, 2007

(87) PCT Pub. No.: WO2005/111554

PCT Pub. Date: Nov. 24, 2005

(65) Prior Publication Data

US 2008/0047760 A1    Feb. 28, 2008

(30) Foreign Application Priority Data

May 14, 2004   (DE)   ............... 10 2004 024 109

(51) Int. Cl.
*G01G 19/40* (2006.01)
(52) U.S. Cl. .............. 702/101; 177/25.13; 209/592
(58) Field of Classification Search ............. 702/101, 702/102; 177/25.13; 209/592
See application file for complete search history.

(56) References Cited

U.S. PATENT DOCUMENTS

| 5,644,489 A * | 7/1997 | Hagenbuch .......... 455/456.1 |
| 5,694,656 A * | 12/1997 | Huang ...................... 5/290 |
| 5,923,001 A * | 7/1999 | Morris et al. ............ 177/245 |
| 6,794,586 B1 * | 9/2004 | Mason .................. 177/25.15 |
| 2002/0031997 A1 | 3/2002 | Lawler, Jr. et al. |
| 2002/0052703 A1 * | 5/2002 | Tabet ....................... 702/101 |
| 2003/0102367 A1 | 6/2003 | Monette et al. |
| 2005/0006153 A1 * | 1/2005 | Baarsch et al. ........ 177/25.13 |
| 2005/0218219 A1 * | 10/2005 | Sano et al. ............... 235/383 |

FOREIGN PATENT DOCUMENTS

| EP | 1 174 909 A2 | 1/2002 |
| EP | 1 248 244 A2 | 10/2002 |
| JP | 2002171098 A2 | 6/2002 |
| JP | 2007-125449 A * | 5/2007 |
| RU | 2045780 C1 | 10/1995 |
| RU | 2127057 C1 | 3/1999 |
| WO | WO 00/21032 | 4/2000 |
| WO | WO 01/58603 A1 | 8/2001 |
| WO | WO 02/15115 A1 | 2/2002 |
| WO | WO 03/102501 A1 | 11/2003 |

* cited by examiner

*Primary Examiner*—Randy W Gibson
(74) *Attorney, Agent, or Firm*—Schwabe, Williamson & Wyatt (57) ABSTRACT

A product with a transponder is conveyed along a measurement line of a weighing device and an actual weight value is determined. An exchange of data with the transponder and weighing system enable automatic adjustment of the weighing system for a specified product type and/or sorting of the product based on comparisons of the actual weight value with a target weight value.

30 Claims, 2 Drawing Sheets

Fig. 1